United States Patent
Prindle

(10) Patent No.: US 6,824,288 B2
(45) Date of Patent: Nov. 30, 2004

(54) METHOD AND APPARATUS FOR ILLUMINATING A KEYPAD

(76) Inventor: Rick D. Prindle, 2053 Houlton La., Plano, TX (US) 75025

(\*) Notice: Subject to any disclaimer, the term of this patent is extended or adjusted under 35 U.S.C. 154(b) by 52 days.

(21) Appl. No.: 10/163,749

(22) Filed: Jun. 5, 2002

(65) Prior Publication Data

US 2003/0112620 A1 Jun. 19, 2003

Related U.S. Application Data

(63) Continuation of application No. 09/589,975, filed on Jun. 8, 2000, now abandoned.

(51) Int. Cl.[7] .................................. F21V 9/16
(52) U.S. Cl. ...................... 362/84; 362/34; 362/24; 362/23; 362/802
(58) Field of Search .......................... 362/84, 34, 23, 362/24, 205, 802, 88; 345/170; 200/313, 314; 379/368

(56) References Cited

U.S. PATENT DOCUMENTS

| | | | | |
|---|---|---|---|---|
| 4,320,268 A | \* | 3/1982 | Brown | 200/5 A |
| 6,148,075 A | \* | 11/2000 | Inubushi et al. | 379/368 |
| 6,416,196 B1 | \* | 7/2002 | Lemarchand et al. | 362/84 |
| 6,590,508 B1 | \* | 7/2003 | Howell et al. | 341/22 |

\* cited by examiner

*Primary Examiner*—Thomas M. Sember
*Assistant Examiner*—Bao Q. Truong
(74) *Attorney, Agent, or Firm*—John F Bryan

(57) ABSTRACT

Apparatus for back-lit illumination of key designation characters in a keypad has a plurality of individual translucent key cores arranged in a planar pattern, with a base membrane disposed between key cores and fitting around each key at least the outer ends of the key cores except for the key designation characters. An elastomeric, electroluminescent lamp (EEL) is held in assembly between the inner ends of the key cores and a domed switch panel, so as to illuminate the designation characters when activated and deform locally when a key is depressed.

12 Claims, 2 Drawing Sheets

METHOD AND APPARATUS FOR ILLUMINATING A KEYPAD

This application is a continuation of application Ser. No. 09/589,975 filed Jun. 8, 2000 now abandoned.

FIELD OF THE INVENTION

This invention relates to the field of keypad illumination and particularly, to the application of electroluminescent systems for this purpose.

BACKGROUND AND SUMMARY OF THE INVENTION

Keypads are widely used to facilitate data and command input for variety of devices in the consumer electronics industries. These devices include cellular telephones, personal organizers, hand-held computers, pagers, calculators and the like. The design of such keypads has been refined to provide good tactile feedback in light-weight, inexpensive sub-assemblies. When there is a potential for use under low ambient lighting it is desirable to provide integral keypad illumination for some devices. For example, keypad illumination can be particularly useful in cellular telephones and personal organizers. In the current state-of-the-art, such illumination is provided by an array of subminiature or surface mount LED lamps, nested in a minimal space between the keypad and the key contact panel. While such arrangements can be effective, power consumption and bulk pose inherent design challenges. Power consumption is sometimes addressed by inclusion of a power-on time limit. The bulk effect can be minimized by careful design, but most likely at the expense of uniform illumination. Thus, there are trade-offs and compromises that can impact both functionality and sales appeal of the product.

Therefore, a first object of the present inventions is to provide apparatus that facilitates the illumination of keypads. A second object of the inventions is that this keypad illumination apparatus be in a compact, light-weight form that does not materially increase product bulk and/or weight. A third object of these inventions is to provide keypad illumination apparatus with a significantly reduced power requirement. Yet other objects are that this apparatus maintains good tactile feel and provides uniform light distribution.

In a preferred embodiment of the present inventions apparatus for back-lit illumination of key designations in a keypad comprises a plurality of individual, translucent key cores. A base membrane disposed in a horizontal plane around and between key cores maintains the key pattern. A thin flexible, opaque film covers the upper surface of the base membrane and the key cores and is laser etched to expose characters for illumination on the key operating ends. In the alternative, the opaque film covering may be omitted and the characters may be opaque. An elastomeric, membrane-like electroluminescent lamp (EEL), as disclosed by Burrows in U.S. Pat. No. 5,856,030, is interposed between the keypad and the key contact panel where it is held in assembly against the horizontal lower surface of the base membrane and the lower, actuating ends of the keys, so as to be stretched when a key is actuated. Positioned thusly, the EEL serves to illuminate the designation characters through the key cores when activated.

DETAILED DESCRIPTION OF THE PREFERRED EMBODIMENT

Figure 1:
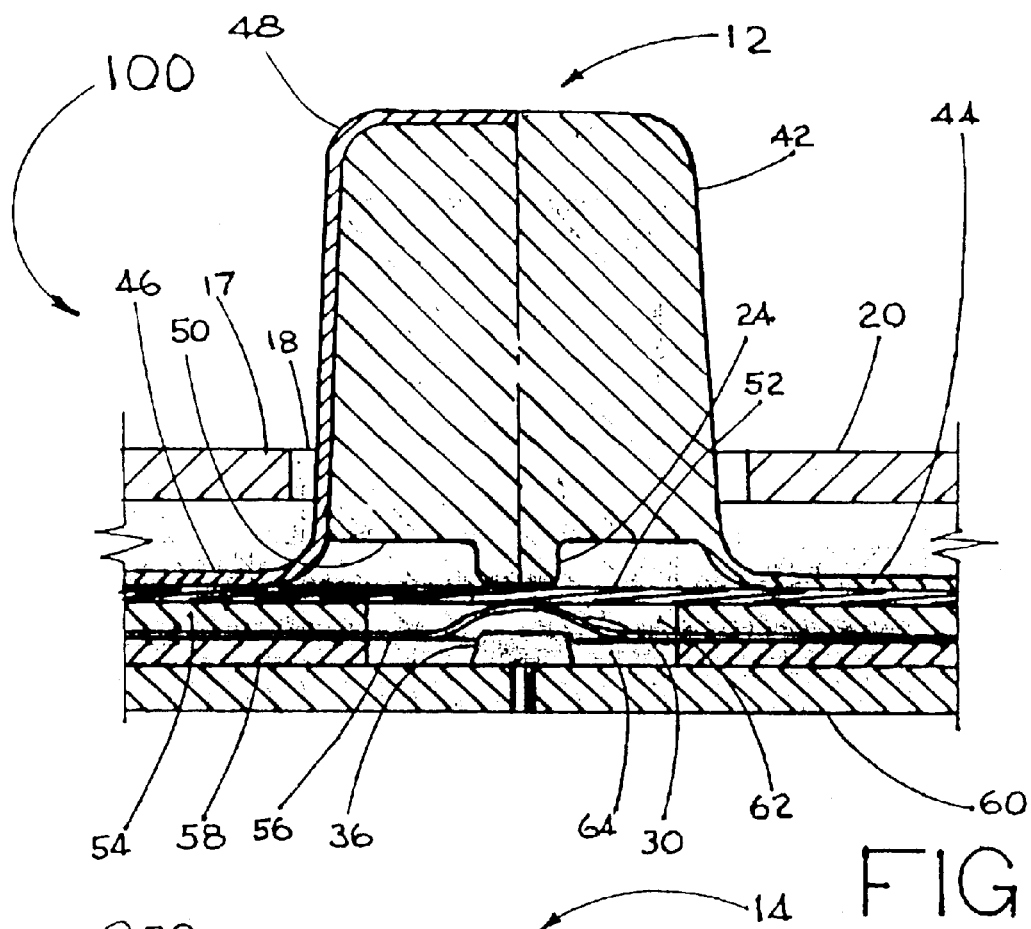
FIG. 1 is a cross-sectional view of a first preferred embodiment of the illuminated keys of the present inventions.

The present inventions are described in the following by referring to drawings of examples of how the inventions can be made and used. In these drawings, reference characters are used throughout the views to indicate like or corresponding parts. The embodiments shown and described herein are exemplary. Many details are well known in the art, and as such are neither shown nor described.

Figure 2:
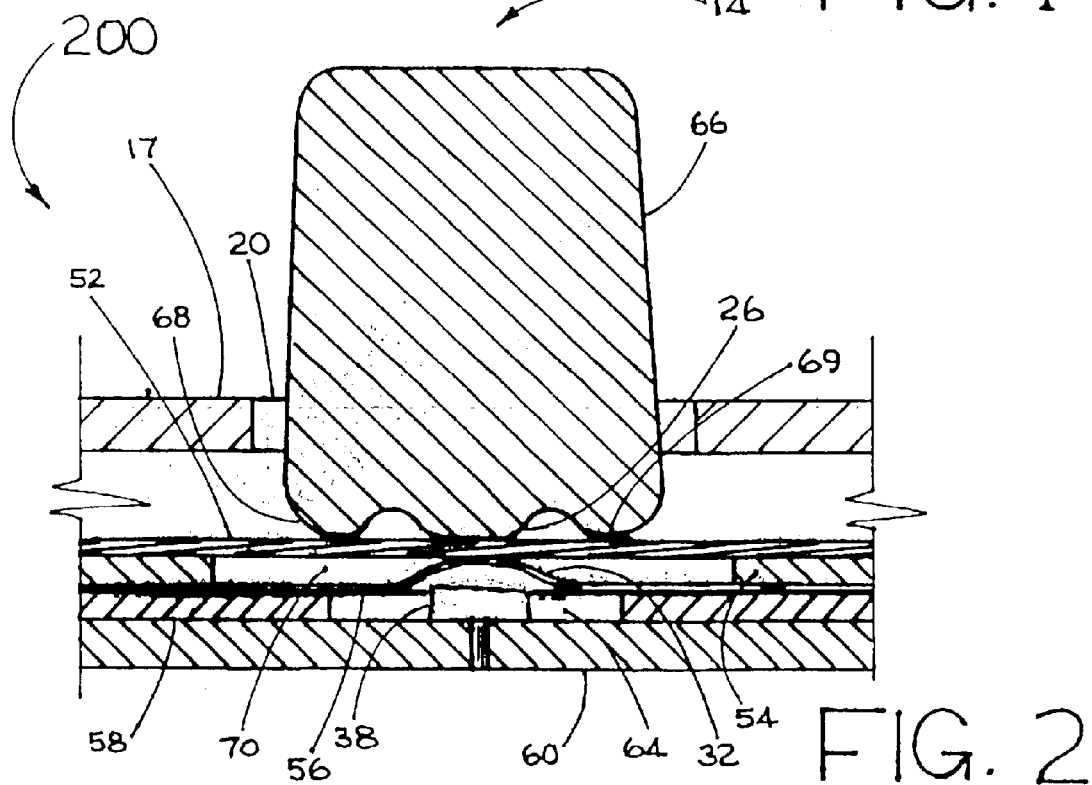
FIG. 2 is a cross-sectional view of a second preferred embodiment of the illuminated keys of the present inventions.
Figure 3:
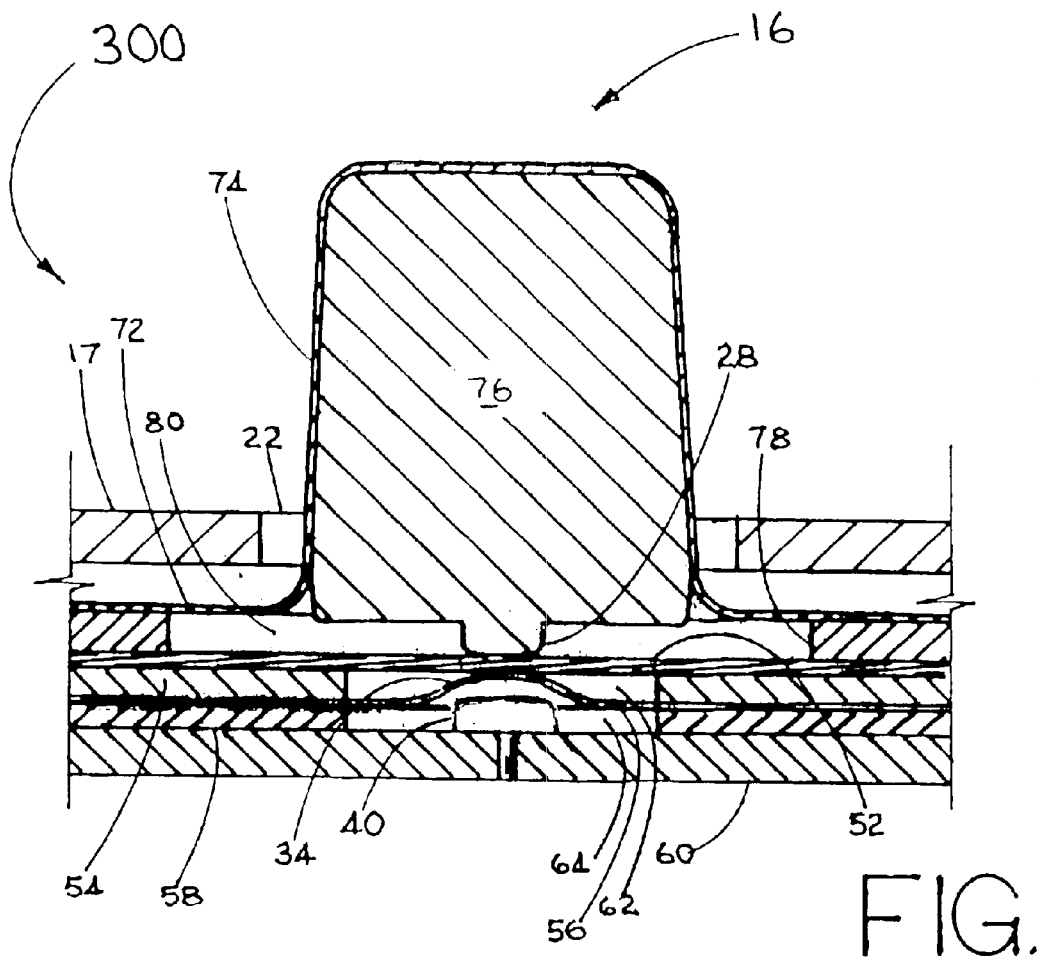
FIG. 3 is a cross-sectional view of a third preferred embodiment of the illuminated keys of the present inventions.

FIGS. 1, 2 and 3 show a cross-sectional view of three variations of a keypad assembly incorporating the present inventions, embodiments 100, 200 and 300. In reference to these drawings, key assemblies 12, 14 and 16 respectively, each represent a plurality of keys. There is shown, in the manner well known to those skilled in the art, how the outer ends of these keys extend through holes 18, 20 and 22 respectively in keyboard 17. Also well known is the manner in which inner end extensions 24, 26 and 28 respectively, deflect domes 30, 32 and 34 to provide selective electrical continuity with contacts 36, 38 and 40.

In FIG. 1, keys 12 can be made as part of a monolithic unit wherein key cores 42 and base membrane 44 are formed of an elastic, translucent material such as a silicone rubber compound or can be made as an assembly wherein elastic base membrane 46 includes a plurality of pockets 48 into which individual, translucent key cores 50 are fitted. In either case, base membrane 44 or 46 is fixedly mounted with respect to elastomeric electroluminescent lamp (EEL) 52, either directly, or through the thickness of a spacer as described below in FIG. 3. EEL 52 is fixedly mounted atop a stack assembly comprising spacer board 54, domed switch contact panel 56, spacer board 58 and circuit board 60. Domed switch 56, a component well known to those skilled in the art, comprises a thin, metallic spring sheet with a plurality of individual domed contacts 30, which give tactile feedback for switch actuation. When key 12 is depressed, deflection of elastic base membrane 44 or 46 allows extension 24 to press against EEL 52 and in turn, by virtue of the elasticity of EEL 52, to deflect dome 30 against contact 36. The diameter of hole 62 in spacer board 54 provides sufficient area to allow the required stretching and deflection of EEL 52 for the fatigue cycle design life of the keypad, as does hole 64 in spacer board 58 for deflection of switch contact panel 56.

Figure 4:
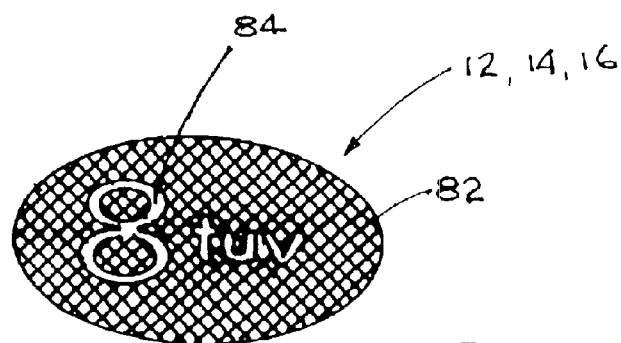
FIG. 4 shows the characters at a typical key operating end.

Application of power, preferably 50–200VAC, to EEL 52 generates luminescence that impinges upon the inner ends of translucent key cores 42 or 50. The outer ends of keys 12, and preferably the entire outer surface, is covered with a thin opaque film 82, too thin to show in cross section. The appropriate characters are laser etched on the end of each key 12, as shown in FIG. 4, so that its translucent nature provides illumination. Alternatively, opaque characters may be printed on the outer end surface of the translucent keys.

In FIG. 2, keys 14 are made as individual, translucent key cores 66 and adhesively bonded to EEL 52. Bonding ring 68 is made on the inner end of key 66 to provide area for a competent bonded joint 69 and extension 26 is centrally located to align with dome 32. Again, EEL 52 is fixedly mounted atop the stack assembly comprising spacer board 54, domed switch contact panel 56, spacer board 58 and circuit board 60. When key 14 is depressed the elasticity of EEL 52 allows it to deflect against dome 32, which is pushed against contact 38. The diameter of hole 70 in spacer board 54 is larger than the previously described diameter of hole 62 because of the diameter of bonding ring 68, so as to be sufficient to allow the required deflection of EEL 52 for $10^6$ cycles without fatigue. As before, application of power to EEL 52 generates luminescence that impinges upon the inner end of translucent key cores 66. The outer ends of key cores 66 and preferably their entire outer surface, is covered with a thin opaque film 82, too thin to show in cross section. The appropriate characters are laser etched on the end of each key 14, so that the character itself is illuminated by EEL 52. Alternatively, opaque characters may be printed on the outer end surface of the translucent keys.

I claim:

1. Apparatus for backlit illumination of key designation characters in a keypad, comprising:

a plurality of translucent key cores having outer, operating ends and inner, actuating extentions, the inner extensions being held in a specific planar pattern in a first position and operable to move to a second, displaced position in the planar pattern;

an elastomeric, electroluminescent lamp held against the inner, actuating extensions so as to stretch across a local area when an operating end is placed in the second position;

a switch panel having individual domed switches arranged in a matching planar pattern wherein the elastomeric, electroluminescent lamp is held directly between the inner extensions and the domes and the corresponding domed switch is actuated by the inner extension through contact with the elastomeric, electroluminescent lamp when an operating end is placed in the second position;

a covering on the outer ends, marked to define key designation characters; and a power supply for activating the electroluminescent lamp upon demand, so as to illuminate the key designation characters.

2. Apparatus for backlit illumination of key designation characters in a keypad according to claim 1, wherein the electroluminescent lamp holds the inner extensions in the specific planar pattern.

3. Apparatus for backlit illumination of key designation characters in a keypad according to claim 1, wherein the electroluminescent lamp is adhesively attached to the inner extensions.

4. Apparatus for backlit illumination of key designation characters in a keypad according to claim 1 and further comprising a base membrane, which holds the inner extensions in the specific planar pattern.

5. Apparatus for backlit illumination of key designation characters in a keypad according to claim 4, wherein the key cores are adhesively attached to the base membrane.

6. Apparatus for backlit illumination of key designation characters in a keypad according to claim 4, wherein:

the base membrane is formed from sheet material and has a plurality of integral, key-shaped pockets; and the key cores are separate parts, each fitted into a key shaped pocket.

7. Apparatus for backlit illumination of key designation characters in a keypad according to claim 4, wherein the electroluminescent lamp is the base membrane.

8. Apparatus for backlit illumination of key designation characters in a keypad according to claim 4, wherein the key cores are formed as a monolithic part of the base membrane.

9. Apparatus for backlit illumination of key designation characters in a keypad according to claim 6, wherein the electroluminescent lamp is adhesively attached to the inner extensions.

10. A method for back-lighting key designation characters in a keypad, comprising the steps of:

providing a plurality of translucent key cores, wherein each core has an outer, operating end and a inner, actuating extension;

holding the key cores with the inner ends in a specific, planar pattern;

defining the key designation characters, with an opaque film on the outer ends;

holding the inner extension in contact with an elastomeric, electroluminescent lamp;

holding a separate panel having individual domed switches, arranged in a matching planar pattern, proximate the elastomeric electroluminescent lamp stretching the local area of the elastomeric, electroluminescent lamp contacted by an inner extension, as the outer end is displaced from the planar pattern, so as to actuate an individual domed switch.

11. A method for back-lighting key designation characters in a keypad, comprising the steps of:

providing a plurality of translucent key cores, wherein each core has an outer, operating end and a inner, actuating extension;

locating the key cores with the inner extensions in a specific, planar pattern wherein the operating ends can be moved from a first, passive position to a second, active position;

defining the key designation characters on the outer ends;

holding the inner extensions in contact with an elastomeric, membrane-like, electroluminescent lamp;

activating the elastomeric electroluminescent lamp, so as to illuminate the key designation characters; and stretching the local area of the elastomeric electroluminescent lamp contacted by an inner extension, as an outer end is displaced from the first position to the second position.

12. The method of claim 11 further comprising the step of actuating a domed switch by moving an inner extension into its second position.

* * * * *